United States Patent [19]

Nakamura

[11] Patent Number: 5,415,039

[45] Date of Patent: * May 16, 1995

[54] ACCELERATION SENSOR HAVING PIEZOELECTRIC ELEMENTS HAVING THE SAME DIRECTION OF POLARIZATION

[75] Inventor: Takeshi Nakamura, Nagaokakyo, Japan

[73] Assignee: Murata Manufacturing Co., Ltd., Kyoto, Japan

[*] Notice: The portion of the term of this patent subsequent to Jun. 22, 2010 has been disclaimed.

[21] Appl. No.: 38,490

[22] Filed: Mar. 29, 1993

[30] Foreign Application Priority Data

Apr. 10, 1992 [JP] Japan .................... 4-118353

[51] Int. Cl.$^6$ ............................................. G01P 15/09
[52] U.S. Cl. ................................. 73/517 AV; 73/510; 310/321
[58] Field of Search .............. 73/517 AV, 517 R, 510, 73/493; 310/321, 329, 316

[56] References Cited

U.S. PATENT DOCUMENTS 4,739,211  4/1988  Strachan .................. 310/321
5,220,833  6/1993  Nakamura .............. 310/316 X Primary Examiner—Richard E. Chilcot, Jr.
Assistant Examiner—Joseph L. Felber
Attorney, Agent, or Firm—Nikaido, Marmelstein, Murray & Oram

[57] ABSTRACT

An acceleration sensor includes a vibrator of, for example, a quadrangular prism shape. On the opposed side faces of the vibrator, piezoelectric elements are formed. The piezoelectric elements are polarized from the outside toward the vibrator side. Driving signals of the same phase are applied to these piezoelectric elements. The vibrator vibrates in its longitudinal direction by these driving signals. In the vibrator, a resonance frequency of the longitudinal vibration is equalized to a resonance frequency of the bending vibration. A voltage difference between the output voltages of the two piezoelectric elements is detected by a differential circuit. The shape of the vibrator may be a triangular prism shape. In this case, the piezoelectric elements are formed on the three side faces of the vibrator. Two by two combinations of these piezoelectric elements are input to the differential circuits. The piezoelectric elements may be polarized from the vibrator side toward the outside.

8 Claims, 3 Drawing Sheets

F I G. 5
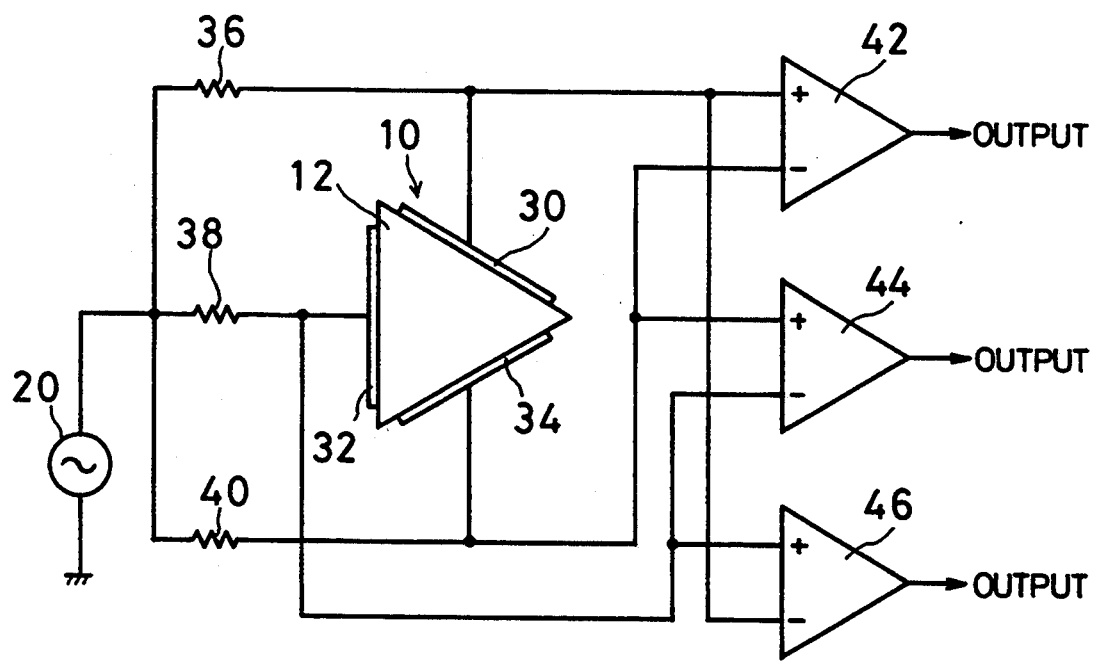

ACCELERATION SENSOR HAVING PIEZOELECTRIC ELEMENTS HAVING THE SAME DIRECTION OF POLARIZATION

BACKGROUND OF THE INVENTION

1. Field of the Invention

This invention relates to an acceleration sensor and, more particularly, to the accelaration sensor using a piezoelectric body.

2. Description of the Prior Art

As a conventional acceleration sensor using a piezoelectric body, a cantilever type supported by one end of the piezoelectric body or a twin-support type supported by both ends of a vibrator was available.

However, the acceleration sensor of such a conventional type was unable to detect slight acceleration as weak as 0.001G.

SUMMARY OF THE INVENTION

Therefore, the principal object of the present invention is to provide an acceleration sensor which can measure slight acceleration with accuracy.

The present invention is an acceleration sensor comprising a vibrator of a polygonal prism shape which is rotationally symmetric with respect to one of its axes, and piezoelectric elements formed on a plurality of side faces of the vibrator which are rotationally symmetric with respect to the axis of the vibrator, wherein the direction of polarization of the piezoelectric elements are same direction with respect to the axis of the vibrator.

In this vibrator, a resonance frequency of the longitudinal vibration is equalized to a resonance frequency of the bending vibration.

The vibrator vibrates in the longitudinal direction by applying a driving signal of the same phase to the plurality of the piezoelectric elements to give inertia to the vibrator. In this state, when acceleration is applied to the vibrator in the direction perpendicular to its side face, the vibrator is deflected. The deflection of the vibrator becomes large by equalizing the resonance frequency of the longitudinal vibration of the vibrator and the resonance frequency of the bending vibration of the vibrator.

According to the present invention, when the vibrator is deflected by applying acceleration to it, voltages generate in the piezoelectric elements depending upon a magnitude of the deflection. By measuring the voltages of the piezoelectric elements, the direction in which the acceleration is applied and the acceleration value can be measured. The deflection of the vibrator becomes large by equalizing the resonance frequency of the longitudinal vibration of the vibrator and the resonance frequency of the bending vibration of the vibrator, and this enables to detect a slight acceleration.

The above and further objects, features, aspects and advantages of the invention will be more fully apparent from the following detailed description with the accompanying drawings.

BRIEF DESCRIPTION OF THE DRAWINGS

FIG. 5 is an illustrative view showing an another embodient of the present invention.

DESCRIPTION OF THE PREFERRED EMBODIMENTS

Figure 1:
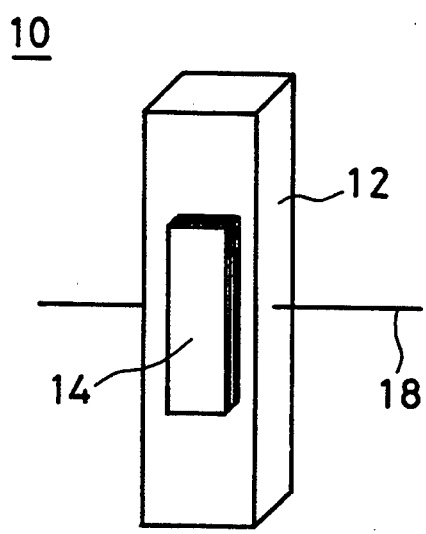
FIG. 1 is a perspective view showing one embodiment of the present invention.
Figure 2:
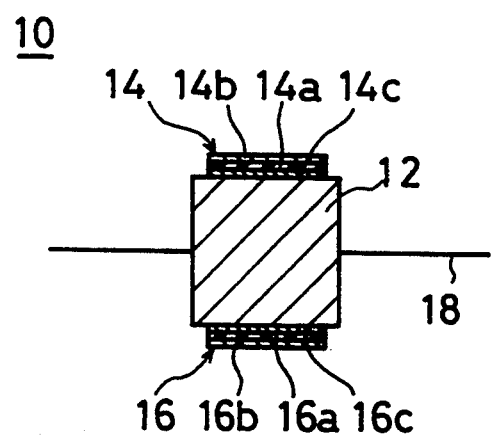
FIG. 2 is a sectional view showing the acceleration sensor of FIG. 1.

FIG. 1 is a perspective view showing one embodiment of the present invention, and FIG. 2 is its sectional view. The acceleration sensor 10 includes, for example, a regular quadrangular prism shaped vibrator 12. The vibrator 12 is formed of, for example, a constant elastic metal material such as elinvar. On two opposed side faces of the vibrator 12, piezoelectric elements 14 and 16 are formed on their center portions respectively. The piezoelectric element 14 includes a piezoelectric body 14a made of piezoelectric ceramics or the like. On both surfaces of the piezoelectric body 14a, electrodes 14b and 14c are formed. One electrode 14c is bonded to a side face of the vibrator 12. Similarly, the piezoelectric element 16 includes a piezoelectric body 16a, on both surfaces of which electrodes 16b and 16c are formed respectively. One electrode 16c is bonded to a side face of the vibrator 12. The piezoelectric bodies 14a and 16a of these piezoelectric elements 14 and 16 are polarized from the outside toward the side of the vibrator 12 respectively. That is, the piezoelectric body 14a is polarized from the side of the electrode 14b toward the side of the electrode 14c, and the piezoelectric body 16a is polarized from the side of the electrode 16b toward the side of the electrode 16c. On the centers of the side faces of the vibrator 12 on which the piezoelectric elements are not formed, supporting members 18 for supporting the vibrator 12 are fixed.

Figure 3:
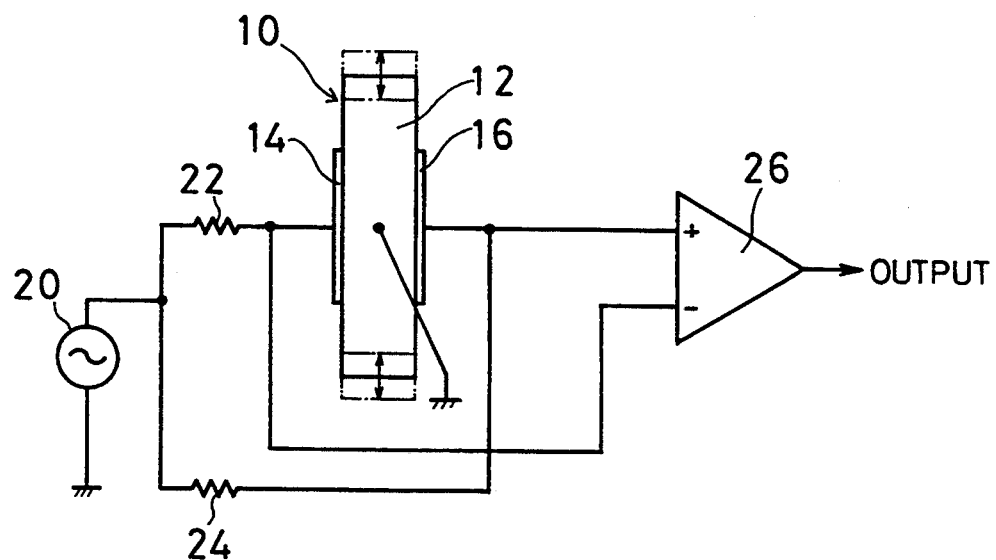
FIG. 3 is an illustrative view showing a state in which acceleration is not applied to the acceleration sensor of FIG. 1.

As shown in FIG. 3, an oscillation circuit 20 is connected in parallel to the piezoelectric elements 14 and 16 of the acceleration sensor 10. A signal from the oscillation circuit 20 is applied to the piezoelectric elements 14 and 16 via a resistor 22 and 24 respectively. The signals applied to the piezoelectric elements 14 and 16 respectively are of the same phase. Because the respective piezoelectric elements 14 and 16 have been polarized from the outside toward the side of the vibrator 12, the vibrator 12 vibrates in its longitudinal direction as shown with the arrows of FIG. 3. Inertia is given to the vibrator 12 by vibration of itself in its longitudinal direction.

Furthermore, the piezoelectric elements 14 and 16 are respectively connected to input terminals of an operational amplifier 26 for differential amplificaion. Therefore, an output corresponding to a voltage difference between the voltages generated in the piezoelectric elements 14 and 16 is obtained at the output terminal of the operational amplifier 26. When acceleration is not applied to the vibrator 12, voltages generated in the piezoelectric elements 14 and 16 have the same value and the same phase. Therefore, the output of the operational amplifier 26 is zero.

Figure 4:
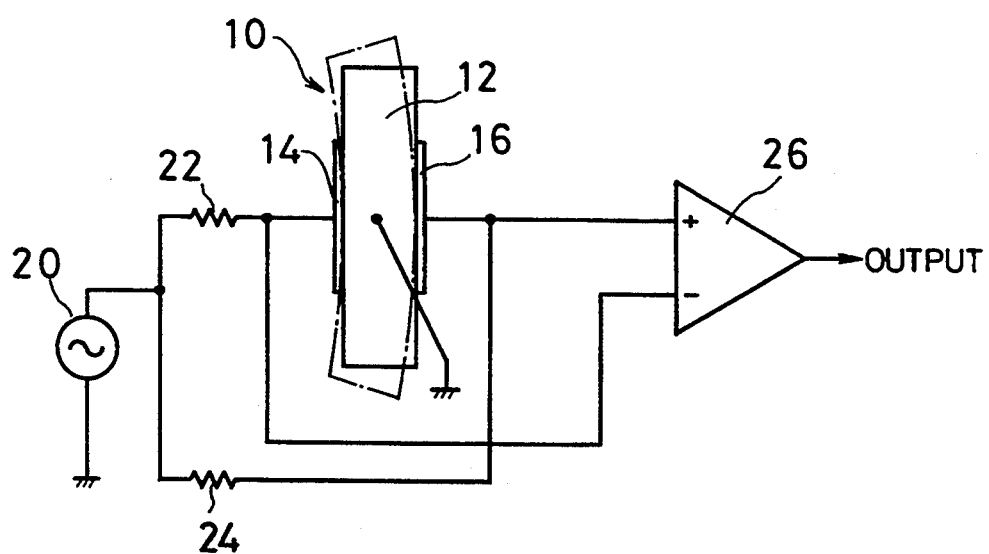
FIG. 4 is an illustrative view showing a state in which acceleration is applied to the acceleration sensor of FIG. 1.

In a state of vibration of the vibrator 12, when acceleration is applied to the vibrator 12 in the direction perpendicular to the faces of the piezoelectric elements 14 and 16, the vibrator 12 is deflected as shown in FIG. 4. Voltages generate in the piezoelectric elements 14 and 16 due to the deflection of the vibrator 12, and the voltages are of an opposite phase. Therefore, an output corresponding to a voltage difference between the voltages generated in the piezoelectric elements 14 and 16 is obtained from the operational amplifier 26. Thus, when measuring the output of the operational amplifier 26, an acceleration applied to the acceleration sensor 10 can be detected.

In the acceleration sensor 10, because the piezoelectric bodies 14a and 16a have been polarized from the outside toward the side of the vibrator 12, voltages generated in the piezoelectric elements 14 and 16 when acceleration is applied have an opposite phase respectively. Therefore, when measuring a voltage difference between the output voltages of the piezoelectric elements 14 and 16, a large value of the output can be obtained. Thus, a slight acceleration can be correctly measured. Furthermore, when a resonance frequency of the longitudinal vibration of the vibrator 12 is equalized to a resonance frequency of the bending vibration of the vibrator 12, the deflection of the vibrator 12 becomes large at application of acceleration. Therefore, the sensor can sense a slight acceleration, thereby providing a good sensitivity.

FIG. 5 is a circuit diagram showing another embodiment of the present invention. In this embodiment, the vibrator 12 is formed in a regular triangular prism shape. On the center portion of each side face of the vibrator 12, piezoelectric elements 30, 32 and 34 are formed. The piezoelectric bodies of these piezoelectric elements 30, 32 and 34 also are polarized from the outside toward the side of the vibrator 12. An oscillation circuit 20 is connected in parallel to these piezoelectric elements 30, 32 and 34 via resistors 36, 38 and 40 respectively.

Two of the piezoelectric elements 30, 32 and 34 are combined and connected to input terminals of operational amplifiers 42, 44 and 46. That is, the piezoelectric elements 30 and 32 are connected to the two input terminals of the operational amplifier 46, and the piezoelectric elements 32 and 34 are connected to the two input terminals of the operational amplifier 44, and the piezoelectric elements 30 and 34 are connected to the two input terminals of the operational amplifier 42.

In this acceleration sensor 10 also, the vibrator 12 vibrates in its longitudinal direction by the signal of the oscillation circuit 20. In this state, when acceleration is applied to the vibrator 12 in the direction perpendicular to the axis of the acceleration sensor 10, the vibrator 12 is deflected. Depending upon the deflection of the vibrator 12, voltages generate in the respective piezoelectric elements 30, 32 and 34. That is, in the piezoelectric elements 30, 32 and 34, the voltage corresponding to an acceleration component in the direction perpendicular to each side face of the vibrator 12 is generated. An output corresponding to a voltage difference between the output voltages of the piezoelectric elements connected to the respective input terminals of the operational amplifier is obtained from the respective operational amplifiers 42, 44 and 46. Therefore, when measuring the values of the outputs from these operational amplifiers 42, 44 and 46, the value and the direction of acceleration can be detected.

In addition, the vibrator 12 may have other shapes including, for example, a regular pentagonal prism shape. In this case, the piezoelectric element is formed on the center portion of each side face of the regular pentagonal prism shaped vibrator. The piezoelectric body of each piezoelectric element is polarized from the outside toward the vibrator side. As mentioned above, any shape of the vibrator 12 may be used if it is a prism shape which is rotation symmetric with respect to its axis. In this case, the piezoelectric elements are not necessarily formed on all side faces of the vibrator, but it is necessary to arrange the piezoelectric elements in rotation symmetry to the prism axis. Furthermore, the shape of the vibrator 12 is not limited to a regular polygonal prism shape, and any polygonal prism shape may be used if it is rotational symmetric with respect to its axis. In addition, in the above embodiments, the piezoelectric bodies are polarized from the outside toward the vibrator side, however, all piezoelectric bodies may be polarized from the vibrator side toward the outside. That is, any direction of polarization of the piezoelectric bodies is acceptable if they are the same direction with respect to the axis of the vibrator.

It will be apparent from the foregoing that, while the present invention has been described in detail and illustrated, these are only particular illustrations and examples and the invention is not limited to these. The spirit and scope of the invention are limited only by the appended claims.

What is claimed is:

1. An acceleration sensor comprising:
   a vibrator of a polygonal prism shape which is rotationally symmetric with respect to one axis thereof; and
   piezoelectric elements formed on a plurality of side faces of said vibrator which are rotationally symmetric with respect to said axis of said vibrator, wherein in direction of polarization of said piezoelectric elements are in the same direction with respect to said axis of said vibrator.

2. An acceleration sensor according to claim 1, wherein the resonance frequency of longitudinal vibration of said vibrator and the resonance frequency of bending vibration of said vibrator are equal.

3. An acceleration sensor according to claim 2, wherein the direction of the polarization of said piezoelectric elements is the direction from the outside toward said vibrator side.

4. An acceleration sensor according to claim 3, wherein said vibrator is formed into a quadrangular prism shape, and said piezoelectric elements are formed on opposed side faces of said vibrator.

5. An acceleration sensor according to claim 3, wherein said vibrator is formed into a triangular prism shape, and said piezoelectric elements are formed on three side faces of said vibrator.

6. An acceleration sensor according to claim 2, wherein the direction of the polarization of the piezoelectric elements is the direction from said vibrator side toward the outside.

7. An acceleration sensor according to claim 6, wherein said vibrator is formed into a quadrangular prism shape, and said piezoelectric elements are formed on opposed side faces of said vibrator.

8. An acceleration sensor according to claim 6, wherein said vibrator is formed into a triangular prism shape, and said piezoelectric elements are formed on three side faces of said vibrator.

* * * * *